US007031276B2

(12) United States Patent
Inoue

(10) Patent No.: US 7,031,276 B2
(45) Date of Patent: Apr. 18, 2006

(54) COMMUNICATION SYSTEM USING ACCESS CONTROL FOR MOBILE TERMINALS WITH RESPECT TO LOCAL NETWORK

(75) Inventor: Atsushi Inoue, Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 945 days.

(21) Appl. No.: 09/962,892

(22) Filed: Sep. 26, 2001

(65) Prior Publication Data

US 2002/0036991 A1 Mar. 28, 2002

(30) Foreign Application Priority Data

Sep. 28, 2000 (JP) ............................. 2000-296831

(51) Int. Cl.
*H04Q 7/00* (2006.01)
(52) U.S. Cl. ...................................... 370/328; 370/401
(58) Field of Classification Search ................ 370/328, 370/331, 338, 395.5, 395.52, 401; 455/405, 455/406, 411, 412.2, 423.3, 432.1, 435.1, 455/436
See application file for complete search history.

(56) References Cited

U.S. PATENT DOCUMENTS 5,826,186 A * 10/1998 Mitchell et al. ............ 455/410

| | | | | |
|---|---|---|---|---|
| 6,526,287 B1 * | 2/2003 | Lee | ........................... | 455/556.1 |
| 6,687,243 B1 * | 2/2004 | Sayers et al. | ................ | 370/356 |
| 6,766,160 B1 * | 7/2004 | Lemilainen et al. | ......... | 455/411 |
| 6,816,724 B1 * | 11/2004 | Asikainen | ................. | 455/414.1 |

FOREIGN PATENT DOCUMENTS

| JP | 3-91356 | 4/1991 |
|---|---|---|
| JP | 7-170564 | 7/1995 |
| JP | 7-297954 | 11/1995 |
| JP | 11-298952 | 10/1999 |
| JP | 11-308666 | 11/1999 |

* cited by examiner

*Primary Examiner*—Man U. Phan
*Assistant Examiner*—Toan Nguyen
(74) *Attorney, Agent, or Firm*—Oblon, Spivak, McClelland, Maier & Neustadt, P.C.

(57) ABSTRACT

In a communication system, even when a mobile terminal device belonging to some mobile carrier does not have a right or a qualification for accessing the fixed communication network via the local network/gateway that is given in advance, this mobile terminal device is enabled to access the fixed communication network via the local network/gateway, by carrying out a procedure for paying the fee from the user of the mobile terminal device to the fixed communication network provider or a procedure for monitoring the mobile terminal device. Also, a device other than the mobile terminal device is enabled to access the resource in the mobile carrier network to which the mobile terminal device belongs, from the local network through the mobile terminal device.

21 Claims, 7 Drawing Sheets

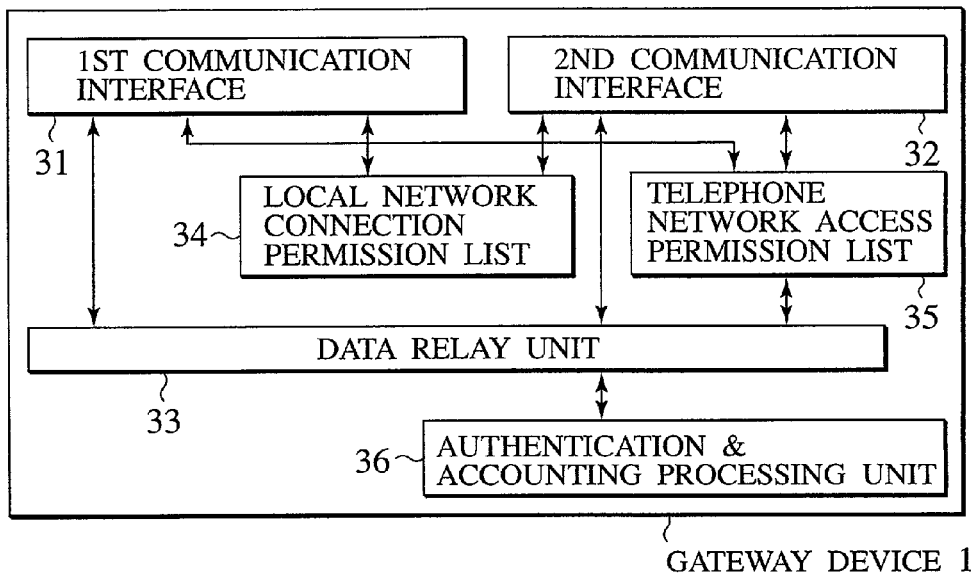
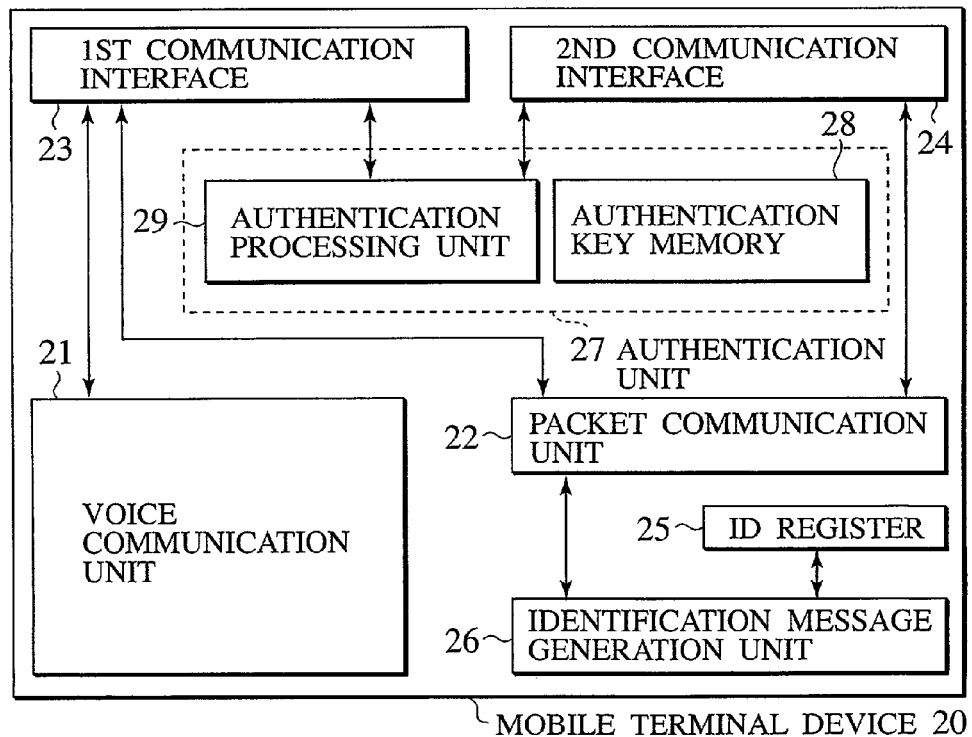

| IP ADDRESS |
|---|
| USER ID |
| CARRIER ID |

COMMUNICATION SYSTEM USING ACCESS CONTROL FOR MOBILE TERMINALS WITH RESPECT TO LOCAL NETWORK

BACKGROUND OF THE INVENTION

1. Field of the Invention

The present invention relates to a mobile communication system using a mobile terminal device which is capable of accessing both a mobile communication network and a local network simultaneously and a gateway device for relaying between a fixed communication network and a local network.

2. Description of the Related Art

In conjunction with the rapid spread of cellular phones and the Internet, the Internet service using a cellular phone as a terminal has been developed by the mobile carriers. This is a service in which a module for processing a communication protocol called TCP/IP used in the Internet is provided in the cellular phone so as to enable WWW service, e-mail delivery, static image and video image data transfer, etc. This service has an advantage in that it becomes possible to freely access not just information closed within the communication service provider but also various information available on the Internet that is spreading worldwide, and for this reason the number of users of this service is increasing rapidly.

Now, the cellular phone Internet service that has an enormous number of users encounters a serious problem regarding how to assign addresses to terminals. Currently, the Internet faces with the problem of IP address shortage in view of the ever increasing number of nodes (routers and terminals), and in the current IPv4, it has been customary to use an address system called private address that is closed within an organization for accesses in an enterprise network and to use global addresses only for accesses to the external of the organization by utilizing the address conversion. Similarly, in the case of the cellular phone Internet service, it is currently customary to use the private address within the cellular phone network by providing an address conversion device (NAT: Network Address Translator) at a border between the IP packet network of the cellular phone company and the global Internet.

On the other hand, the next generation IP specification called IPv6 is currently under the development. The IPv6 can accommodate far more nodes compared with the IPv4 by expanding the IP address from a 32 bits width as used in the IPv4 to a 128 bits width. Similarly, in the case of the cellular phone Internet service, it is possible to assign unique global addresses to all terminals by adopting the IPv6. In this way, communications using a seamless end-to-end connection that does not require a relay device such as NAT on the communication path can be realized by using a wide address space, and it is expected to be advantageous in many aspects including the security and the quality of service (QoS). Also, the IPv6 has a function called address autoconfiguration for automatically generating an address from a network ID managed by each router and a unique ID of the device, and this is expected to make the management of hosts easier.

Also, recently, in conjunction with the advance of the wireless technology, the techniques for locally connecting various types of devices by a wireless network have been developed. One such technique is the wireless standard called Bluetooth which connects devices in short distances by using 2.4 GHz unlicensed radio band. In the Bluetooth, devices can carry out mutual data communications by forming an ad-hoc network called pico-net. The similar network specification also includes the HomeRF which is intended for use in the home network.

Now, consider a situation in which the packet service based on the IPv6 scheme is introduced into the cellular phone network, for example, such that the Internet access via the cellular phone network and the ISP (Internet Service Provider) network is possible according to the IPv6. Here, it is assumed that, in the home network, the Internet access is made via a gateway device and this gateway device is connected with various devices through a local (wireless) network such as Bluetooth or the like. On the other hand, it is also assumed that the portable terminal is capable of accessing the Internet via the cellular phone network and the portable terminal is also capable of accessing the Bluetooth network by using another communication interface. Namely, consider a situation where the user of the cellular phone receives services by accessing the IP network of the cellular phone network while the user is located outside the home, and receives services by accessing the gateway connected to the fixed ISP network, via the Bluetooth network, while the user is located inside the home.

Here, when an attempt to access the Bluetooth network inside the home is made by using a portable terminal, the access is not necessarily possible for every portable terminal. Considering that it is inside the home, it is possible to consider a control such that the access is possible for those portable terminals that have an access right or an access qualification such as portable terminals owned by the family members, but the access to the Bluetooth network is not permitted for any other portable terminals. However, this is a rather inflexible policy because the Internet access using the home network is not permitted at all for visitors other than the family members.

In particular, in the case of the fixed access network that is not necessarily limited to the home network, it is preferable to use a control such that those terminals that have the membership qualification can access for free, and even non-member terminals can access upon payment of appropriate fee. Else, at least when the terminal with no permission given in advance is accessing the access network, there is a need to acquire the log information of that access so as to realize the monitoring for preventing the illegal act by the malicious user, even if no fee is to be charged.

In other words, it is preferable to permit access even for the terminal with no permission given in advance after carrying out the prescribed charging or log acquisition processing, rather than simply permitting access only for those portable terminals that have carried out the user registration.

There is also a problem regarding how an access made from a device in the fixed network or from the Internet via the gateway in the opposite direction should be connected to a resource in the cellular phone network. Namely, the cellular phone user is responsible for all the accesses in general, so that there is a need for the cellular phone to function as proxy after carrying out the appropriate authentication sequence.

For example, there is a need to prevent an attack to or an illegal use of the resource on the cellular phone network side by verifying the authenticity of the access by communicating a prescribed message or authentication code with the cellular phone or by making an entry into a cellular phone network access list provided in the gateway, such that the portable terminal permits the access to the resource in the cellular phone network only when the authenticity is verified and filters out any other messages.

BRIEF SUMMARY OF THE INVENTION

It is therefore an object of the present invention to provide a communication system in which a mobile terminal device belonging to some mobile carrier network can access a fixed communication network via a local network/gateway even when this mobile terminal device does not have a right or a qualification for accessing the fixed communication network via the local network/gateway that is given in advance.

It is another object of the present invention to provide a communication system in which a device other than the mobile terminal device can access the resource in the mobile carrier network to which the mobile terminal device belongs, from the local network through the mobile terminal device.

According to one aspect of the present invention there is provided a communication system, comprising: a mobile terminal device capable of accessing both a mobile communication network and a local network simultaneously; and a gateway device provided between a fixed communication network and the local network; the mobile terminal device having: an identification information notification unit configured to notify a device identification information of the mobile terminal device and a mobile carrier identification information of a mobile carrier to which the mobile terminal device belongs, to the gateway device, at a time of accessing the fixed communication network from the local network through the gateway device; and a user response notification unit configured to notify a user response indicating user's acceptance or refusal of an accounting condition notified from the gateway device, to the gateway device; and the gateway device having: an accounting condition notification unit configured to notify the accounting condition for the mobile terminal device to access the fixed communication network through the gateway device when the device identification information notified from the mobile terminal device is not registered at the gateway device in advance, to the mobile terminal device; and a user message notification unit configured to notify a message indicating the device identification information and the mobile carrier identification information notified from the mobile terminal device, and a fact that a user of the mobile terminal device as identified by the device identification information and the mobile carrier identification information has accepted a payment of a fee according to the accounting condition to a fixed communication network provider through the mobile carrier identified by the mobile carrier identification information, to a fixed communication network side, when the user's response indicating user's acceptance of the accounting condition is notified from the mobile terminal device.

According to another aspect of the present invention there is provided a communication system, comprising: a mobile terminal device capable of accessing both a mobile communication network and a local network simultaneously; and a gateway device provided between a fixed communication network and the local network; the mobile terminal device having: an identification information notification unit configured to notify a device identification information of the mobile terminal device and a mobile carrier identification information of a mobile carrier to which the mobile terminal device belongs, to the gateway device, at a time of accessing the fixed communication network from the local network through the gateway device; and the gateway device having: a checking unit configured to check whether the mobile terminal device is related to any illegal user or not according to the device identification information and the mobile carrier identification information notified from the mobile terminal device when the device identification information notified from the mobile terminal device is not registered at the gateway device in advance; and an access control unit configured to permit an access to the fixed communication network by the mobile terminal device and start a processing for monitoring the access to the fixed communication network by the mobile terminal device through the gateway device, when the mobile terminal device is not related to any illegal user as a result of checking by the checking unit.

According to another aspect of the present invention there is provided a communication system, comprising: a mobile terminal device capable of accessing both a mobile communication network and a local network simultaneously; and a gateway device provided between a fixed communication network and the local network; the mobile terminal device having: an authentication unit configured to carry out an authentication of a communication device which is either located on the local network or connected through the gateway device, when a request for access to a mobile communication network side via the mobile terminal device is received from the communication device through the local network; and a relay unit configured to start a processing for relaying packets from the communication device to the mobile communication network side when the authentication by the authentication unit succeeds.

According to another aspect of the present invention there is provided a communication system, comprising: a mobile terminal device capable of accessing both a mobile communication network and a local network simultaneously; and a gateway device provided between a fixed communication network and the local network; the gateway device having: a processing unit configured to judge whether a packet received from a fixed communication network side and destined to a mobile communication network side via the mobile terminal device is to be relayed to the mobile terminal device or not according to an attribute of the packet upon receiving the packet; and a transfer unit configured to transfer the packet to the mobile terminal device through the local network when the packet is judged to be relayed by the processing unit; and the mobile terminal device having: an authentication unit configured to carry out an authentication of a communication device, when a request for access to the mobile communication network side via the mobile terminal device is received from a communication device located on the local network; and a relay unit configured to start a processing for relaying packets from the communication device to the mobile communication network side when the authentication by the authentication unit succeeds.

According to another aspect of the present invention there is provided a mobile terminal device capable of accessing both a mobile communication network and a local network simultaneously, the mobile terminal device comprising: a first communication interface provided with respect to the mobile communication network; a second communication interface provided with respect to the local network; a packet communication unit configured to carry out first packet communications through the first communication interface and second packet communications through the second communication interface; an identification information notification unit configured to notify a device identification information of the mobile terminal device and a mobile carrier identification information of a mobile carrier to which the mobile terminal device belongs, to a gateway device provided between a fixed communication network and the local network, at a time of accessing the fixed communication network via the gateway device, through the second communication interface; and a user response notification unit configured to notify a user response indicating user's acceptance or refusal of a condition for the mobile terminal device to access the fixed communication network through the gateway device that is presented from the gateway device after the device identification information and the mobile carrier identification information are notified to the gateway device by the identification information notification unit.

According to another aspect of the present invention there is provided a mobile terminal device capable of accessing both a mobile communication network and a local network simultaneously, the mobile terminal device comprising: a first communication interface provided with respect to the mobile communication network; a second communication interface provided with respect to the local network; a packet communication unit configured to carry out first packet communications through the first communication interface and second packet communications through the second communication interface; an authentication unit configured to carry out an authentication of a communication device which is either located on the local network or connected through a gateway device provided between a fixed communication network and the local network, when a request for access to a mobile communication network side via the mobile terminal device is received from the communication device through the second communication interface; and a relay unit configured to start a processing for relaying packets from the communication device to the mobile communication network side when the authentication by the authentication unit succeeds.

According to another aspect of the present invention there is provided a gateway device provided between a fixed communication network and a local network, the gateway device comprising: a first communication interface provided with respect to the fixed communication network; a second communication interface provided with respect to the local network; a packet communication unit configured to carry out first packet communications through the first communication interface and second packet communications through the second communication interface; an accounting condition notification unit configured to notify an accounting condition for a mobile terminal device to access the fixed communication network through the gateway device when a procedure for accessing the fixed communication network from the mobile terminal device is received through the second communication interface and a device identification information notified from the mobile terminal device is not registered at the gateway device in advance, to the mobile terminal device; and a user message notification unit configured to notify a message indicating the device identification information and a mobile carrier identification information notified from the mobile terminal device, and a fact that a user of the mobile terminal device as identified by the device identification information and the mobile carrier identification information has accepted a payment of a fee according to the accounting condition to a fixed communication network provider through the mobile carrier identified by the mobile carrier identification information, to a fixed communication network side, when a user response indicating user's acceptance of the accounting condition is notified from the mobile terminal device through the second communication interface.

According to another aspect of the present invention there is provided a gateway device provided between a fixed communication network and a local network, the gateway device comprising: a first communication interface provided with respect to the fixed communication network; a second communication interface provided with respect to the local network; a packet communication unit configured to carry out first packet communications through the first communication interface and second packet communications through the second communication interface; a checking unit configured to check whether a mobile terminal device is related to any illegal user or not according to a device identification information and a mobile carrier identification information notified from the mobile terminal device when a procedure for accessing the fixed communication network from the mobile terminal device is received through the second communication interface and the device identification information notified from the mobile terminal device is not registered at the gateway device in advance; and an access control unit configured to permit an access to the fixed communication network by the mobile terminal device and start a processing for monitoring the access to the fixed communication network by the mobile terminal device through the gateway device, when the mobile terminal device is not related to any illegal user as a result of checking by the checking unit.

According to another aspect of the present invention there is provided a gateway device provided between a fixed communication network and a local network, the gateway device comprising: a first communication interface provided with respect to the fixed communication network; a second communication interface provided with respect to the local network; a packet communication unit configured to carry out first packet communications through the first communication interface and second packet communications through the second communication interface; a processing unit configured to judge whether a packet received from a fixed communication network side and destined to a mobile communication network side via a mobile terminal device which is capable of accessing both a mobile communication network and the local network simultaneously, is to be relayed to the mobile terminal device through the second communication interface or not according to an attribute of the packet upon receiving the packet from the fixed communication network side through the first communication interface; and a transfer unit configured to transfer the packet to the mobile terminal device through the second communication interface when the packet is judged to be relayed by the processing unit.

According to another aspect of the present invention there is provided a method for controlling a mobile terminal device capable of accessing both a mobile communication network and a local network simultaneously, the method comprising: notifying a device identification information of the mobile terminal device and a mobile carrier identification information of a mobile carrier to which the mobile terminal device belongs, to a gateway device provided between a fixed communication network and the local network, at a time of accessing the fixed communication network via the gateway device, through the local network; and notifying a user response indicating user's acceptance or refusal of a condition for the mobile terminal device to access the fixed communication network through the gateway device that is presented from the gateway device after the device identification information and the mobile carrier identification information are notified to the gateway device.

According to another aspect of the present invention there is provided a method for controlling a mobile terminal device capable of accessing both a mobile communication network and a local network simultaneously, the method comprising: carrying out an authentication of a communication device which is either located on the local network or connected through a gateway device provided between a fixed communication network and the local network, when a request for access to a mobile communication network side via the mobile terminal device is received from the communication device; and starting a processing for relaying packets from the communication device to the mobile communication network side when the authentication succeeds.

According to another aspect of the present invention there is provided a method for controlling a gateway device provided between a fixed communication network and a local network, the method comprising: notifying an accounting condition for a mobile terminal device to access the fixed communication network through the gateway device when a procedure for accessing the fixed communication network from the mobile terminal device is received through the local network and a device identification information notified from the mobile terminal device is not registered at the gateway device in advance, to the mobile terminal device; and notifying a message indicating the device identification information and a mobile carrier identification information notified from the mobile terminal device, and a fact that a user of the mobile terminal device as identified by the device identification information and the mobile carrier identification information has accepted a payment of a fee according to the accounting condition to a fixed communication network provider through the mobile carrier identified by the mobile carrier identification information, to a fixed communication network side, when a user response indicating user's acceptance of the accounting condition is notified from the mobile terminal device through the local network.

According to another aspect of the present invention there is provided a method for controlling a gateway device provided between a fixed communication network and a local network, the method comprising: checking whether a mobile terminal device is related to any illegal user or not according to a device identification information and a mobile carrier identification information notified from the mobile terminal device when a procedure for accessing the fixed communication network from the mobile terminal device is received through the local network and the device identification information notified from the mobile terminal device is not registered at the gateway device in advance; and permitting an access to the fixed communication network by the mobile terminal device and starting a processing for monitoring the access to the fixed communication network by the mobile terminal device through the gateway device, when the mobile terminal device is not related to any illegal user as a result of checking.

According to another aspect of the present invention there is provided a method for controlling a gateway device provided between a fixed communication network and a local network, the method comprising: judging whether a packet received from a fixed communication network side and destined to a mobile communication network side via a mobile terminal device which is capable of accessing both a mobile communication network and the local network simultaneously, is to be relayed to the mobile terminal device through the local network or not according to an attribute of the packet upon receiving the packet from the fixed communication network side; and transferring the packet to the mobile terminal device through the local network when the packet is judged to be relayed.

According to another aspect of the present invention there is provided a computer program product for causing a computer to control a mobile terminal device capable of accessing both a mobile communication network and a local network simultaneously, the computer program product comprising: first computer program codes for causing the computer to notify a device identification information of the mobile terminal device and a mobile carrier identification information of a mobile carrier to which the mobile terminal device belongs, to a gateway device provided between a fixed communication network and the local network, at a time of accessing the fixed communication network via the gateway device, through the local network; and second computer program codes for causing the computer to notify a user response indicating user's acceptance or refusal of a condition for the mobile terminal device to access the fixed communication network through the gateway device that is presented from the gateway device after the device identification information and the mobile carrier identification information are notified to the gateway device.

According to another aspect of the present invention there is provided a computer program product for causing a computer to control a mobile terminal device capable of accessing both a mobile communication network and a local network simultaneously, the computer program product comprising: first computer program codes for causing the computer to carry out an authentication of a communication device which is either located on the local network or connected through a gateway device provided between a fixed communication network and the local network, when a request for access to a mobile communication network side via the mobile terminal device is received from the communication device; and second computer program codes for causing the computer to start a processing for relaying packets from the communication device to the mobile communication network side when the authentication succeeds.

According to another aspect of the present invention there is provided a computer program product for causing a computer to control a gateway device provided between a fixed communication network and a local network, the computer program product comprising: first computer program codes for causing the computer to notify an accounting condition for a mobile terminal device to access the fixed communication network through the gateway device when a procedure for accessing the fixed communication network from the mobile terminal device is received through the local network and a device identification information notified from the mobile terminal device is not registered at the gateway device in advance, to the mobile terminal device; and second computer program codes for causing the computer to notify a message indicating the device identification information and a mobile carrier identification information notified from the mobile terminal device, and a fact that a user of the mobile terminal device as identified by the device identification information and the mobile carrier identification information has accepted a payment of a fee according to the accounting condition to a fixed communication network provider through the mobile carrier identified by the mobile carrier identification information, to a fixed communication network side, when a user response indicating user's acceptance of the accounting condition is notified from the mobile terminal device through the local network.

According to another aspect of the present invention there is provided a computer program product for causing a computer to control a gateway device provided between a fixed communication network and a local network, the computer program product comprising: first computer program codes for causing the computer to check whether a mobile terminal device is related to any illegal user or not according to a device identification information and a mobile carrier identification information notified from the mobile terminal device when a procedure for accessing the fixed communication network from the mobile terminal device is received through the local network and the device identification information notified from the mobile terminal device is not registered at the gateway device in advance; and second computer program codes for causing the computer to permit an access to the fixed communication network by the mobile terminal device and start a processing for monitoring the access to the fixed communication network by the mobile terminal device through the gateway device, when the mobile terminal device is not related to any illegal user as a result of checking.

According to another aspect of the present invention there is provided a computer program product for causing a computer to control a gateway device provided between a fixed communication network and a local network, the computer program product comprising: first computer program codes for causing the computer to judge whether a packet received from a fixed communication network side and destined to a mobile communication network side via a mobile terminal device which is capable of accessing both a mobile communication network and the local network simultaneously, is to be relayed to the mobile terminal device through the local network or not according to an attribute of the packet upon receiving the packet from the fixed communication network side; and second computer program codes for causing the computer to transfer the packet to the mobile terminal device through the local network when the packet is judged to be relayed.

Other features and advantages of the present invention will become apparent from the following description taken in conjunction with the accompanying drawings.

BRIEF DESCRIPTION OF THE DRAWINGS

FIG. 2 is a block diagram showing an exemplary configuration of a gateway device in the communication system of FIG. 1.

FIG. 3 is a block diagram showing an exemplary configuration of a mobile terminal device in the communication system of FIG. 1.

DETAILED DESCRIPTION OF THE INVENTION

Referring now to FIG. 1 to FIG. 10, one embodiment of a communication system according to the present invention will be described in detail.

Figure 1:
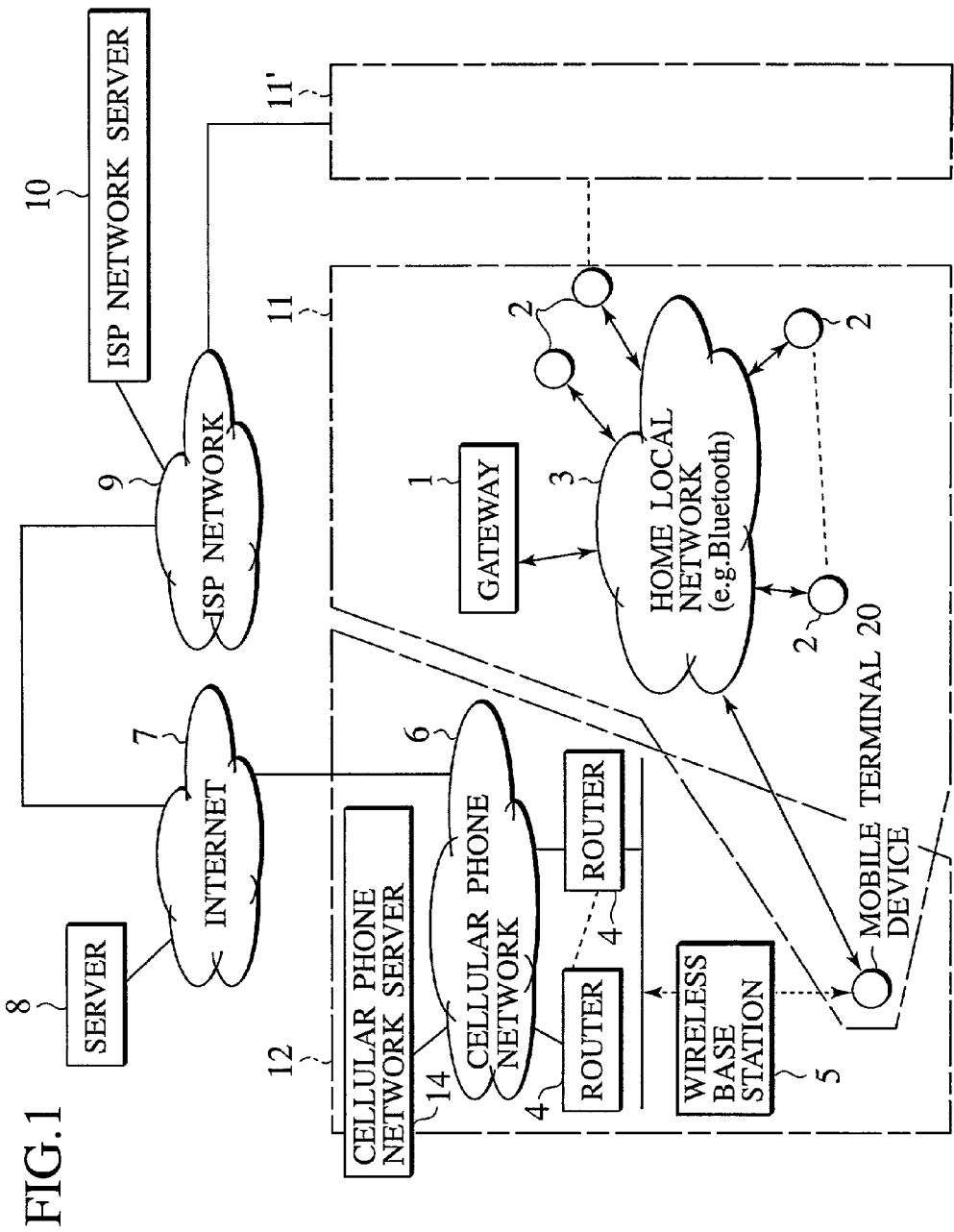
FIG. 1 is a block diagram showing an exemplary configuration of a communication system according to one embodiment of the present invention.
Figure 4:
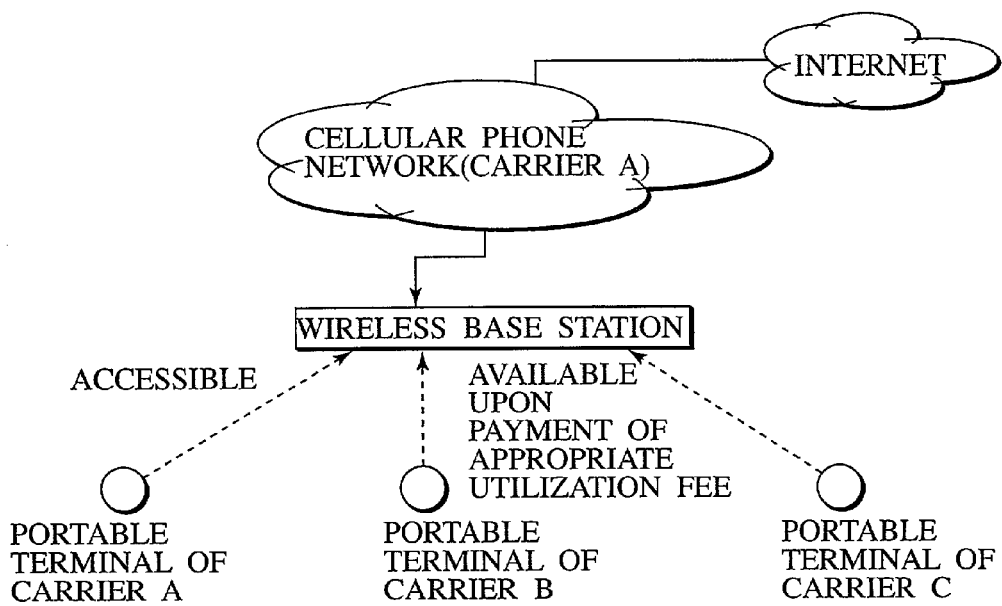
FIG. 4 is a diagram for explaining the exemplary case where a provider provides a local wireless service with respect to a public area in the communication system according to the present invention.

FIG. 1 shows an exemplary configuration of a communication system according to this embodiment.

In FIG. 1, a region enclosed by a dashed line 12 corresponds to a mobile carrier network portion. In the mobile carrier network 12, a plurality of network links are connected through a cellular phone network 6 and router devices 4. Each router device 4 has at least functions of an ordinary router (such as a router compatible with the IPv4 or the IPv6, for example).

The mobile carrier network 12 is assumed to be originally providing the ordinary voice communication service, but a configuration for providing the ordinary voice communication service is omitted in FIG. 1. Note that this embodiment is directed to the exemplary case where one mobile carrier manages its own packet communication network as a single management domain, but there can also be cases where one mobile carrier has a plurality of management domains, cases where a plurality of mobile carriers have a single common management domain, and any combination of these cases.

The mobile terminal device 20 (such as a portable terminal or a cellular phone, for example) will be connected to the corresponding network link through a wireless base station 5 corresponding to a geographic location of the mobile terminal device 20. Then, the mobile terminal device 20 becomes capable of carrying out packet communications (according to the IPv4 or the IPv6) with a node located within the same network link, a node within the same management domain through the router device 4, or a node (such as a server 8, for example) located outside the management domain through the router device 4 and the Internet 7.

Note that there can be a plurality of mobile carrier networks 12 which are operated by different mobile carriers. In such a case, it is assumed that the mobile terminal device 20 belongs to one of these mobile carriers.

On the other hand, in FIG. 1, a region enclosed by a chain line 11 corresponds to a home network portion. In the home network 11, various types of devices 2 and a gateway 1 are connected through a home local network 3. In this embodiment, the home local network 3 is assumed to be a local wireless network such as Bluetooth, for example. The mobile terminal device 20 has a function for accessing this home local network 3.

A plurality of home networks 11 and 11' can be connected to a single ISP network 9. Each one of the home networks 11 and 11' has basically the same configuration (although the detailed configuration may be different).

The gateway device 1 of the home network 11 is assumed to be connected to the external Internet 7 through a fixed communication network 9 (which is assumed to be an ISP network here).

Note that this embodiment is directed to the exemplary case where one Internet service provider manages its own ISP network as a single management domain, but there can also be cases where one service provider has a plurality of management domains, cases where a plurality of service providers have a single common management domain, and any combinations of these cases.

The mobile terminal device 20 and the devices 2 connected to the home local network 3 are capable of carrying out packet communications (according to the IPv4 or the IPv6) with the server 8 on the Internet 7 through the gateway device 1 and the ISP network 9 (after carrying out a prescribed procedure). In addition, they are also capable of carrying out packet communications (according to the IPv4 or the IPv6) with a server 10 for providing services limited only to members within the ISP network 9, for example, when such a server 10 exists.

Note that, in FIG. 1, the dashed line 12 and the chain line 11 are depicted only for the sake of explaining the basic configuration logically, and they do not indicate an area covered by the wireless network. In this embodiment mobile terminal device 20 is assumed to be capable of accessing both the mobile carrier network 12 and the home local network 3 simultaneously.

FIG. 2 shows an exemplary configuration of the gateway device 1 in this embodiment.

As shown in FIG. 2, this gateway device 1 comprises a first communication interface 31 for accessing the ISP network 9, a second communication interface 32 for accessing the home local network 3, a data relay unit 33 for relaying between the first and second communication interfaces 31 and 32, a local network connection permission list 34, a telephone network access permission list 35, and an authentication and accounting processing unit 36. If necessary, the data relay device 33 may include a function for carrying out a protocol conversion, a media conversion, etc., at a time of relaying between the first and second communication interfaces 31 and 32.

The local network connection permission list 34 registers a list of device IDs of the devices that can be connected to the local network 3 on the second communication interface 32 side. The authentication and accounting processing unit 36 looks up a group of necessary servers such as an accounting server and a log server according to a message from the mobile terminal device 20, and carries out the necessary transaction. The telephone network access permission list 35 registers a list indicating a source address, a protocol type, a port number, etc., for enabling a direct access to the cellular phone network 6 side from the ISP network 9 side through the gateway device 1, the home local network 3 and the mobile terminal device 20.

Note that the local network connection permission list 34 is necessary in the case of using a configuration that supports the accounting or log function. The authentication and accounting processing unit 36 is necessary in the case of using a configuration that supports the accounting function. The telephone network access permission list 35 is necessary in the case of using a configuration in which the mobile terminal device 20 has a function for relaying from the local network 3 side to the cellular phone network 6 and the gateway device 1 has a function for judging whether the relaying is permitted or not.

FIG. 3 shows an exemplary configuration of the mobile terminal device 20 in this embodiment.

As shown in FIG. 3, this mobile terminal device 20 comprises a first communication interface 23, for accessing the mobile carrier network 12, a second communication interface 24 for accessing the home local network 3, a voice communication unit 21 for carrying out ordinary voice communications, a packet communication unit 22 for carrying out packet communications (according to the IPv4 or the IPv6), an ID register 25, an identification message generation unit 26, and an authentication unit 27.

The identification information such as the device ID (information for uniquely identifying the device) and an affiliated carrier information (such as an affiliated carrier ID which is information for uniquely identifying the affiliated mobile carrier) of the mobile terminal device 20 is stored in the ID register 25. The identification message generation unit 26 generates a message containing that identification information and transfers it via an appropriate interface whenever necessary. The authentication unit 27 includes an authentication key memory 28 and an authentication processing unit 29, and carries out the prescribed authentication processing at a time of an access from the local network 3 side to the cellular phone network 6.

The ID register 25 and the identification message generation unit 26 are necessary in the case of using a configuration that supports the accounting or log function. The authentication unit 27 is necessary in the case of using a configuration in which the mobile terminal device 20 has a function for relaying from the local network 3 side to the cellular phone network 6.

In the following, the operation of the communication system in this embodiment will be described in detail.

First, the authentication policy in the case where the mobile terminal device accesses the local network will be considered. In general, it is not preferable to allow arbitrary terminal to access the local network from a viewpoint of the security, so that some authentication processing is necessary. For example, in the case of the home network, only the cellular phones owned by the family members are allowed to access the local network. Namely, this is a policy in which the device ID is checked to see if it matches with the access permission list registered in advance, and the access is permitted only for the device with the device ID that matches with the access permission list.

However, in this case, it is impossible to provide a service by which a visitor makes an ISP access via that home network, for example, unless the tedious processing for rewriting the setting file is carried out. In this embodiment, certain level of services are to be conditionally provided to such non-registered users as well.

Now, in general it is not preferable to allow the unspecified users to use the local network mainly for the following two reasons.

(1) The cost for the use of the local network should be paid.

This point becomes clearer in an exemplary case where the mobile carrier A provides a local wireless service with respect to a public area (see FIG. 4), for example, rather than the case of the home network. This local wireless network is formed by the open specification such as Bluetooth, so that the service can be received not only by a user of a portable terminal of the mobile carrier A but also by users of portable terminals of the other mobile carriers B and C, as far as the wireless specification is concerned.

However, from a viewpoint of the mobile carrier A, it is not desirable to allow the users of the other mobile carriers to use its own local wireless network which is provided by the facility investment made by the mobile carrier A, without some compensation.

But, if there is a mechanism for accounting the appropriate utilization fees to the users using the portable terminals of the other mobile carriers B and C, it is possible for the mobile carrier A to allow only those users who agreed to pay the fees to make the connection to its own local wireless network, in view of the convenience of these users. In other words, there can be cases where the connection can be permitted even for the non-registered user as long as this user is willing to pay the utilization fee. To this end, there is a need to provide links with the accounting mechanism and the authentication mechanism.

(2) The use of the local network can be permitted if there is a monitoring mechanism for preventing the illegal act such as network attack by the malicious users.

On the other hand, if there are malicious users who are likely to commit the illegal act such as network attack, it is not desirable to allow the use of the local network to the unspecified devices from a viewpoint of the security as well as from the fact that the user who owns the local network will be held responsible according to the current ISP contract. Namely, there can be a policy for allowing the connection under the condition that the log management is carried out so as to prevent this user from committing the illegal act, by monitoring the jobs of the connecting users at a prescribed server. Of course, it is also possible to take an action such as refusal of the connection for those users who committed the illegal acts in the past.

In order to satisfy the above described condition, there is a need for an authentication and accounting message system across a plurality of servers and clients such as the mobile terminal device, the accounting server of the mobile carrier, the user log information server of the ISP network, etc.

Figure 5:
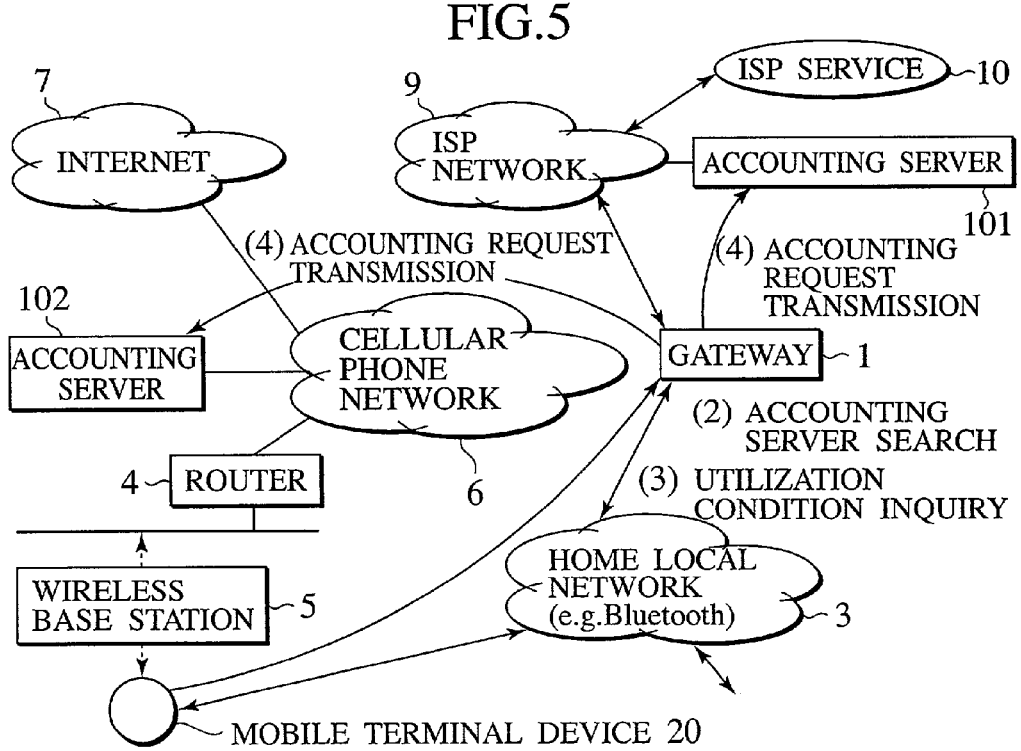
FIG. 5 is a diagram for explaining the exemplary case where a cellular phone user pays fee for the local network access in the communication system according to the present invention.

First, with reference to FIG. 5, the above described case (1) where the user of the mobile terminal device 20 should pay the fee for the local network connection will be described.

Here, it is assumed that the device IDs of one or plurality of the mobile terminal devices 20 to be used by one or plurality of users and the device IDs of the other devices 2 are registered in advance by the telephone network access permission list 35 of the gateway device 1 of some home network 11.

First, the mobile terminal device 20 notifies a message containing its own device ID to the gateway device 1 at a time of accessing the home local network 3 (in order to utilize the ISP network 9). The same also applies to the other device 2.

Upon receiving this message, the gateway device 1 checks whether the device ID contained in the message is registered in the telephone network access permission list 35 or not, and if it is registered, the gateway device 1 provides the gateway service with respect to this mobile terminal device 20 such that this mobile terminal device 20 can access the ISP network 9 through the gateway device 1 (a message indicating this fact may be transmitted from the gateway device 1 to the mobile terminal device 20). In this case, the utilization fee of the ISP network 9 will be charged to the contractor. Note that the same also applies to the other registered device 2.

On the other hand, if the device ID is not registered in the telephone network access permission list 35 of the gateway device 1, the gateway device 1 returns a message indicating that fact to the mobile terminal device 20.

Figures 6, 7:
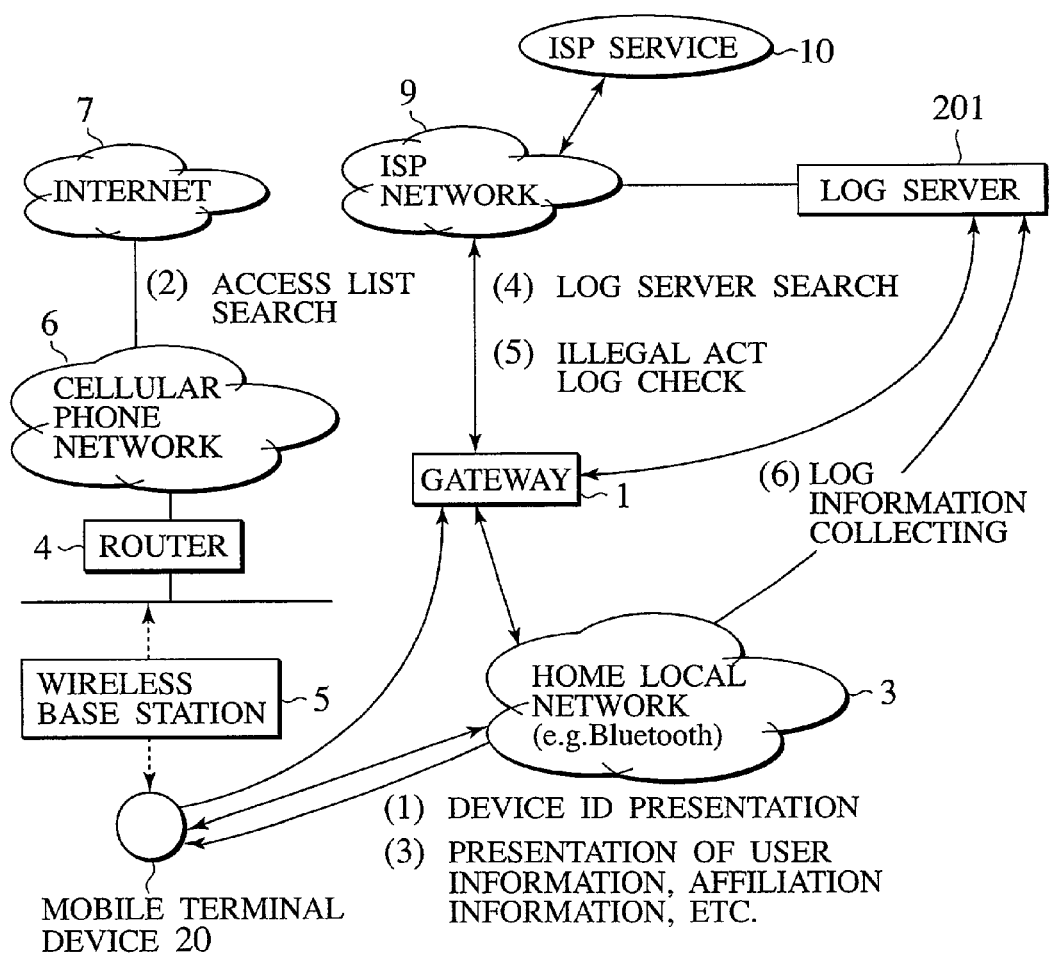
FIG. 6 is a diagram showing one example of a message containing an affiliated carrier information that can be used in the communication system according to the present invention.
FIG. 7 is a diagram for explaining the exemplary case of carrying out a log management for actions of a mobile terminal device in the communication system according to the present invention.

Upon receiving this message, the mobile terminal device 20 transmits a message containing the affiliated carrier information such as the affiliated carrier ID to the gateway device 1. FIG. 6 shows an exemplary form of this message.

Note that the separate messages are transmitted for the device ID and the affiliated carrier information in the above, but it is also possible to transmit a single message containing the device ID and the affiliated carrier information from the mobile terminal device 20 to the gateway device 1.

Now, the gateway device 1 checks the accounting server 101 of the ISP network 9 to which the gateway device 1 is connected, for the mobile terminal device 20 which is not registered in the telephone network access permission list 35, and checks the accounting server 102 of the mobile carrier to which the mobile terminal device 20 belongs on the Internet 7 according to the affiliated carrier information notified from the mobile terminal device 20. Here it is assumed that the processing is terminated when either one of the accounting server 101 and the accounting server 102 is not accessible. Also, the gateway device 1 presents the condition such as the utilization fee on the ISP side to the mobile terminal device 20, according to the prescribed fee system for the guest use of the ISP network 9 (this information may be stored in advance, or acquired from the accounting server 102, for example, when the need arises), and transmits a message for inquiring whether this condition is accepted or not.

Upon receiving this message, the mobile terminal device 20 presents information regarding the condition such as the utilization fee to the user, and receives an input regarding whether this condition for the use of the ISP network 9 is accepted or not from the user.

When the input indicating acceptance or the refusal of the condition for the use of the ISP network 9 is received from the user, the mobile terminal device 20 transmits a message indicating the acceptance or the refusal to the gateway device 1.

When the gateway device 1 receives a message indicating the refusal from the mobile terminal device 20, the gateway device 1 terminates the processing (in which case the gateway device 1 will not provide the gateway service to this mobile terminal device 20).

When the gateway device 1 receives a message indicating the acceptance from the mobile terminal device 20, the gateway device 1 relays a message indicating the acceptance and containing the device ID and the affiliated carrier information of that mobile terminal device 20 to the accounting server 101 of the ISP network 9 (in which case the gateway device 1 will provide the gateway service to this mobile terminal device 20).

When the message from the mobile terminal device 20 is received, the accounting server 101 of the ISP network 9 transmits an accounting message to the accounting server 102 of the mobile carrier to which the mobile terminal device 20 belongs, and receives the transfer of the fee. Here, the gateway device 1 may transmit the accounting message to the accounting server 102 instead. The amount to be paid here can be based on a fixed rate or a meter rate according to the connection time, and in the latter case, the connection time is measured at the ISP side and the accounting message is transmitted to the accounting server 102 of the mobile carrier according to the measurement result.

Note that it is also possible to modify the above operation such that, when the message indicating the acceptance is received from the mobile terminal device 20, the gateway device 1 returns a confirmation message with respect to that message to the mobile terminal device 20, and the mobile terminal device 20 starts the communications after receiving this confirmation message.

Note also that the acceptance or the refusal is entered by the user of the mobile terminal device 20 in the above, but it is also possible to set up a relationship between the condition on the utilization fee and the acceptance or the refusal (by using a table or a function, for example) in the mobile terminal device 20 in advance such that the mobile terminal device 20 automatically judges the acceptance or the refusal and returns a response without presenting the condition to the user in order to confirm the acceptance or the refusal to the user.

It is also possible to change the control content according to the user class (such that the fee system or the content of the service that can be received is different for different user classes, for example) by adding information on the user class at the mobile carrier to which the mobile terminal device 20 belongs (the mobile carrier indicated by the mobile carrier ID in the message of FIG. 6), to the message of FIG. 6. For example, it is possible to change the fee system for the charging or the content of the service to be provided to (the user of) the mobile terminal device 20 differently according to the user class at the mobile carrier, even at the ISP network 9 side as well. Else, it is also possible to make the ISP network 9 accessible only for those mobile terminal devices 20 which have the service class above some level (under the condition that the acceptance of the user is obtained as described above).

Next, with reference to FIG. 7, the above described case (2) of carrying out the log management for the actions by the user of the mobile terminal device 20 will be described.

Here, it is assumed that the device IDs of one or plurality of the mobile terminal devices 20 to be used by one or plurality of users and the device IDs of the other devices 2 are registered in advance by the telephone network access permission list 35 of the gateway device 1 of some home network 11.

First, the mobile terminal device 20 notifies a message containing its own device ID to the gateway device 1 at a time of accessing the home local network 3 (in order to utilize the ISP network 9). The same also applies to the other device 2.

Upon receiving this message, the gateway device 1 checks whether the device ID contained in the message is registered in the telephone network access permission list 35 or not, and if it is registered, the gateway device 1 provides the gateway service with respect to this mobile terminal device 20 such that this mobile terminal device 20 can access the ISP network 9 through the gateway device 1 (a message indicating this fact may be transmitted from the gateway device 1 to the mobile terminal device 20). Note that the same also applies to the other registered device 2.

On the other hand, if the device ID is not registered in the telephone network access permission list 35 of the gateway device 1, the gateway device 1 returns a message indicating that fact to the mobile terminal device 20.

Upon receiving this message, the mobile terminal device 20 transmits a message (shown in FIG. 6, for example) containing the affiliated carrier information such as the affiliated carrier ID to the gateway device 1.

Note that the separate messages are transmitted for the device ID and the affiliated carrier information in the above, but it is also possible to transmit a single message containing the device ID and the affiliated carrier information from the mobile terminal device 20 to the gateway device 1.

Now, the gateway device 1 looks up the log server 201 in the ISP network 9 according to the device ID and the affiliated carrier information, for the mobile terminal device 20 which is not registered in the telephone network access permission list 35.

When the gateway device 1 transmits a look up message containing the user information of the mobile terminal device 20 including the device ID and the affiliated carrier information to the log server 201 for the first time, the log server 201 checks the user information list to see if this user is marked by an illegal user mark indicating a log of making the illegal access in the past or not.

In the case where the illegal user mark is recorded for the mobile terminal device 20, the log server 201 transmits a message indicating the refusal of the access to the gateway device 1, and the gateway device 1 returns this message to the mobile terminal device 20 (in which case this mobile terminal device 20 will not be able to access the ISP network 9).

In the case where the illegal user mark is not recorded for the mobile terminal device 20, the log server 201 transmits a message indicating the permission of the access to the gateway device 1, and the gateway device 1 returns this message to the mobile terminal device 20 (in which case this mobile terminal device 20 will be able to access the ISP network 9).

When the access is permitted for (the user of) the mobile terminal device 20, all of the subsequent actions of the mobile terminal device 20 that are comprehended by the gateway device 1 (or only the jobs on the ISP network 9 side among them) will be transferred from the gateway device 1 to the log server 201. The log server 201 stores the user information list and the log information, and logs of the jobs on the ISP network 9 side of the mobile terminal device 20 will be stored. The log analysis is carried out by a back-end log analysis server (not shown), and if the illegal action is found, the illegal user mark is recorded in the user information list.

The above procedure will be carried out for each ISP access made by the non-registered mobile terminal device 20.

Note that, similarly as in the case (1), it is possible to permit the access when the acceptance of the access condition that the logs will be recorded (or the acceptance of the access condition that the logs will be recorded and the illegal user will be registered if the illegal access is found such that the subsequent accesses will be refused) is obtained from the non-registered mobile terminal device 20.

Also, FIG. 7 is directed to the case where the dedicated log server 201 is located on the ISP network 9 side, but the log server can be located in association with the gateway device 1, for example.

Note that (1) a configuration regarding the accounting as explained with reference to FIG. 5 and (2) a configuration regarding the log as explained with reference to FIG. 7 can be realized in combination. In this case, the non-registered mobile terminal device 20 will be able to access the ISP network 9 through the gateway device 1 when the user of this mobile terminal device 20 accepts the charge and the illegal user mark is not recorded for this mobile terminal device 20.

Figure 8:
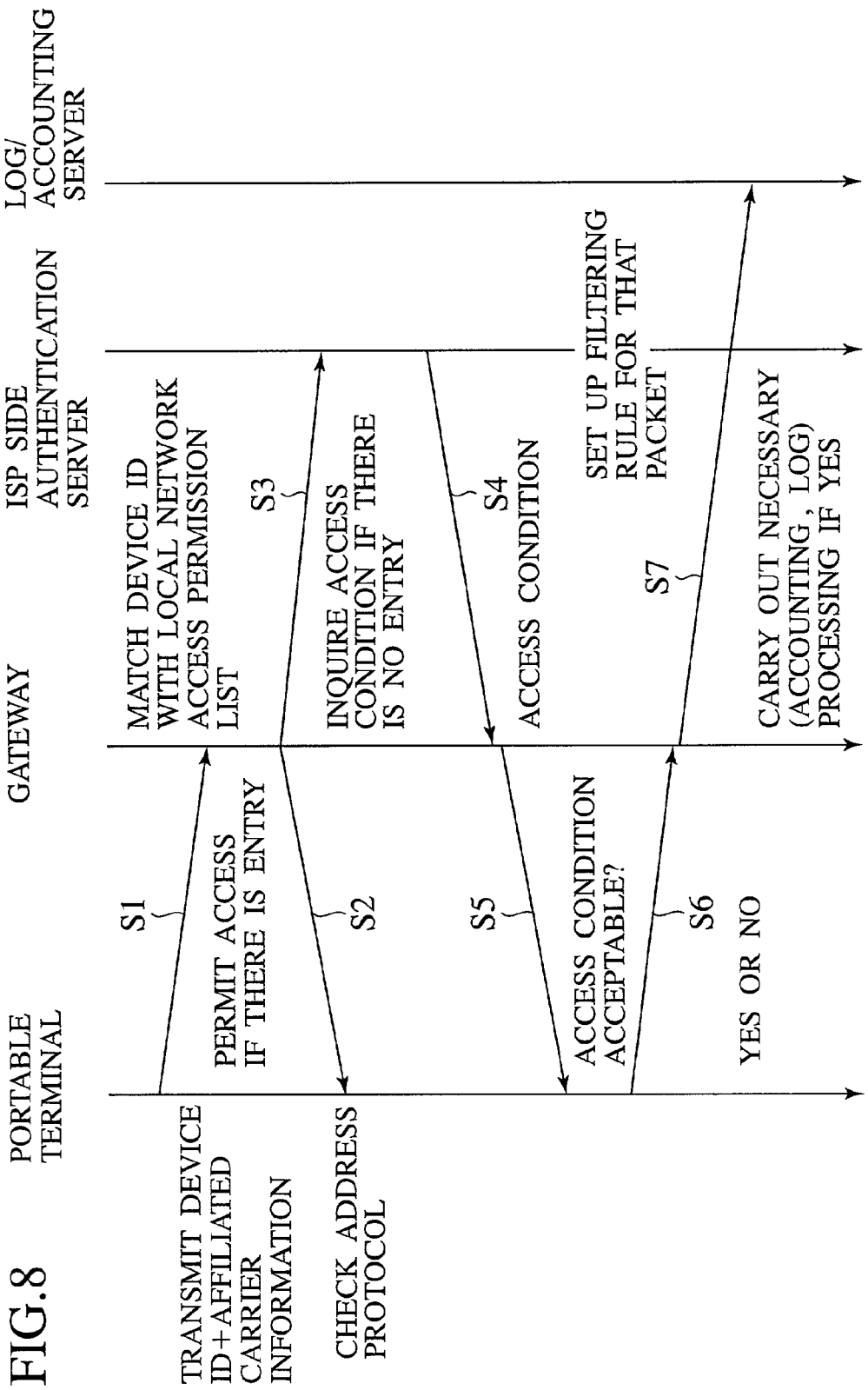
FIG. 8 is a sequence chart for a processing in the case where a mobile terminal device enters a local network in the communication system according to the present invention.

FIG. 8 shows the processing sequence for the above described operation.

The mobile terminal 20 generates an identification message at the identification message generation unit 26 according to its own device ID as well as the content of the ID register 25 such as the affiliated carrier ID, at a time of accessing the home local network 3, and transmits this identification message to the gateway device 1 via the second communication interface 24 (step S1).

At the gateway device 1 side, the content of the local network connection permission list 34 and the device ID of the mobile terminal device 20 are compared, to judge whether the corresponding entry exists or not. If the corresponding entry exists, the access is possible (step S2).

When there is no corresponding entry, the access condition is inquired to the authentication server (not shown) on the ISP network 9 side according to the affiliated carrier ID and the user information (step S3).

The authentication server presents the condition (accounting, log management, etc.) for the mobile terminal device 20 to use the ISP network 9 (step S4), and the gateway device 1 relays this condition and waits for a response from the user of the mobile terminal device 20.

When the user accepts the condition (step S6), the necessary condition processing is carried out.

In the case of carrying out the accounting, the accounting condition and the server to be accounted (the accounting server 102 of the mobile carrier, for example) are notified to the accounting server 101 of the ISP network 9 (step S7). As a result, the accouting according to the amount of use will be carried out.

Also, in the case of carrying out the log acquisition, the matching with the illegal user list in the log server 201 is carried out (step S7), and if there is no illegal access log, the log acquisition is set in the log server 201 and the fact that the access is possible is notified to the mobile terminal device 20.

Figure 9:
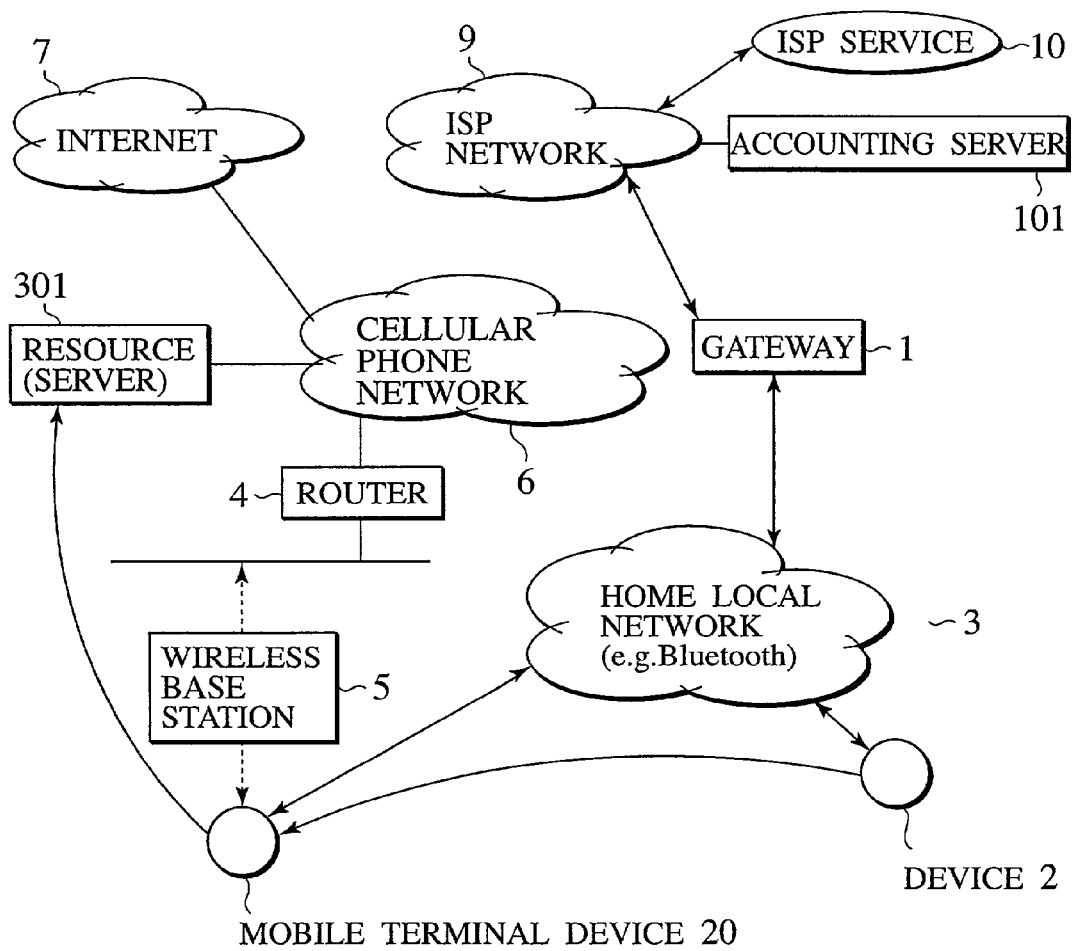
FIG. 9 is a diagram for explaining the exemplary case where a device on a local network side accesses a resource on a cellular phone network side in the communication system according to the present invention.

Next, with reference to FIG. 9, the case where the device 2 on the home local network 3 side accesses the resource (server) 301 located on the cellular phone network 6 side in a state in which the mobile terminal device 20 bridges the cellular phone network 6 and the home local network 3 will be described.

For example, this can be the case when a PDA (Personal Digital Assistant) device 2 connected to the home local network 3 accesses a PIM (Personal Information Manager) data (a schedule table, for example) 301 located on the cellular phone network 6 side and carries out the synchronization processing. Also, the access from the home local network 3 side to the cellular phone network 6 is not necessarily limited to that of the device 2 which is directly connected to the home local network 3. For example, the access can be made from the ISP network 9 side via the gateway device 1.

In this case, the mobile terminal device 20 will be leasing its own access right to the access from the home local network 3 side, so that there is a need for a procedure to permit the access only when the mobile terminal device 20 permits the utilization of its own access right.

Also, there is a need to prevent an attack to or an illegal use of the resource 301 on the cellular phone network 6 side by verifying the authenticity of the access by making an entry into the telephone network access permission list 35 provided in the gateway device 1 with respect to the access from the ISP network 9 side, such that the portable terminal device 20 permits the access to the resource on the cellular phone network 6 side only when the authenticity is verified and filters out any other messages.

More specifically, consider the case where some device 2 wishes to make an access to the cellular phone network 6 while the mobile terminal device 20 is connected by both the first and second communication interfaces 23 and 24.

Figure 10:
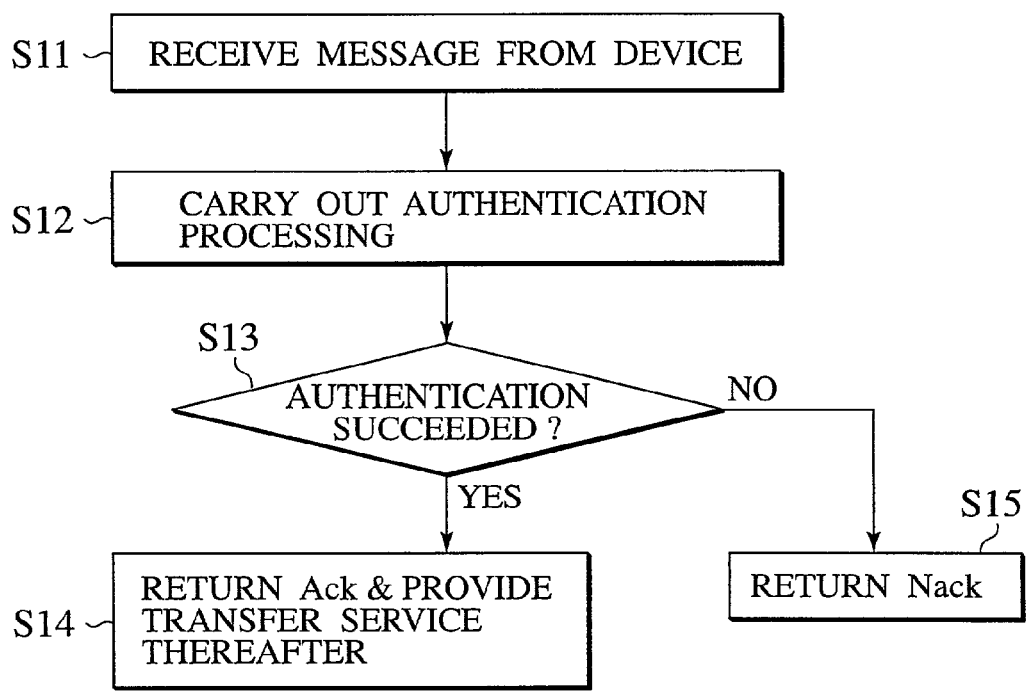
FIG. 10 is a flow chart showing an exemplary processing procedure of a mobile terminal device in the case of relaying packet communications in the communication system according to the present invention.

FIG. 10 shows an exemplary processing of the mobile terminal device 20 in this case.

Here, it is assumed that the device 2 registers a key for the authentication in advance by carrying out the access registration with respect to the cellular phone network 6 side. This key is stored in the authentication key memory 28 of the mobile terminal 28, in correspondence with the ID information of that device 2.

In the case where the device 2 accesses the cellular phone network 6, the device 2 attaches a message authentication code based on a one-way hash function such as MD5, for example, by using this authentication key, to a message in a prescribed format, and transmits this message to the mobile terminal device 20.

Upon receiving this message (step S11), the mobile terminal device 20 carries out the authentication processing (step S12). For example, the authentication key is searched by using the ID information (IP address, for example) in the header of the message as a key, the message authentication code is calculated by the same method (MD5, for example) used by the device 2 in generating the message authentication code, and whether the calculated message authentication code coincides with the message authentication code (generated by the device 2 and) attached to the message or not is checked.

When the authentication succeeds, i.e., when the two message authentication codes coincide in the above example (step S12 YES), Ack message is returned to the device 2 and the subsequent access from the device 2 will be transferred to the cellular phone network 6 (step S13).

On the other hand, when the authentication fails, i.e., when the two message authentication codes do not coincide in the above example (step S12 NO), Nack message is returned to the device (step S15) and the subsequent access from the device 2 will not be transferred to the cellular phone network 6.

Also, in the case where some device from the ISP network 9 side via the gateway device 1 wishes to make an access to the cellular phone network 6 side via the mobile terminal device 20, the authentication key sharing and the sequence using the message authentication code can be used similarly (see FIG. 10).

However, in general, when there are not many accesses from the ISP network 9 side, it is also possible (for the gateway device 1) to give the access permission by checking the matching of the source address, the protocol type, the port number, etc., with the telephone network access permission list 35 in the gateway device 1. In this case, the mobile terminal device 20 will not carry out the authentication as described above for those packets that are transferred through the gateway device 1.

As described, according to this embodiment, when some mobile terminal device is capable of accessing the ISP network via the local network (Bluetooth, etc.)/gateway but does not have an access right or an access qualification with respect to the ISP network that is given in advance, it becomes possible for this mobile terminal device to access the ISP network via the local network/gateway, by carrying out a procedure for paying the fee from the user of the mobile terminal device to the ISP or a procedure for monitoring by recording logs with respect to the mobile terminal device.

In this embodiment, this can be realized by combining the access control list on the gateway and the authentication and accounting messages to be transmitted from the mobile terminal device via the gateway.

Also, when some mobile terminal device is accessible to the cellular phone network and the local network, it becomes possible for a device on the local network or a device on the fixed communication network (via the gateway/local network) to access the resource on the cellular phone network side via this mobile terminal device, by carrying out a procedure for authentication or the access permission.

In this embodiment, it is possible to enable the authenticated telephone network access by defining the authentication sequence between the home network device and the mobile terminal device, and the access to the resource on the cellular phone network side is permitted only for the device that has successfully completed the authentication sequence.

It is also possible to adjust these detailed setting conditions in accordance with the policies of the various networks (such as the home network, the cellular phone network, the fixed communication network). For example, when there is a partnership for carrying out the access log processing at the fixed communication network provider B side on behalf of the cellular phone network provider A, it is possible to carry out the transfer of the authentication and accounting messages by taking this partnership in consideration. Such a customization can be made freely (within a range of not violating the basic policy of each network).

Thus according to the present invention, even when a mobile terminal device belonging to some mobile carrier does not have a right or a qualification for accessing the fixed communication network via the local network/gateway that is given in advance, it is possible for this mobile terminal device to access the fixed communication network via the local network/gateway, by carrying out a procedure for paying the fee from the user of the mobile terminal device to the fixed communication network provider or a procedure for monitoring the mobile terminal device.

Also, according to the present invention, it is possible for a device other than the mobile terminal device to access the resource in the mobile carrier network to which the mobile terminal device belongs, from the local network through the mobile terminal device.

Note that, in the above, it is assumed that the mobile terminal device 20 has the ordinary voice communication function, but the mobile terminal device 20 may have communication functions for information in other forms such as text communications in addition to or instead of the ordinary voice communication function. The mobile terminal device 20 may be a device which is capable of utilizing only the Internet service. The similar modifications are also possible with respect to the services provided by the communication service provider.

Note also that the home network used in the above description can be replaced by any other local network without affecting the applicability of the present invention.

Note also that, in the present invention, the existing IPv4 or IPv6 devices can be used without requiring any modification, and the conventional IPv4 or IPv6 addressing architecture can be used without any change. Consequently, it is advantageous in terms of the compatibility with the existing devices.

Note also that the present invention can be easily expanded according to the network management policies of the various mobile carriers. The present invention is also applicable not only to the IPv4 or IPv6 but also to the packet communications using the cellular phones that are proposed recently.

It is to be noted that the above described embodiment according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, each of the gateway device and the mobile terminal device of the above described embodiment can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A communication system, comprising:
    a mobile terminal device capable of accessing both a mobile communication network and a local network simultaneously; and
    a gateway device provided between a fixed communication network and the local network;
    the mobile terminal device having:
        an identification information notification unit configured to notify a device identification information of the mobile terminal device and a mobile carrier identification information of a mobile carrier to which the mobile terminal device belongs, to the gateway device, at a time of accessing the fixed communication network from the local network through the gateway device; and
        a user response notification unit configured to notify a user response indicating user's acceptance or refusal of an accounting condition notified from the gateway device, to the gateway device; and
    the gateway device having:
        an accounting condition notification unit configured to notify the accounting condition for the mobile terminal device to access the fixed communication network through the gateway device when the device identification information notified from the mobile terminal device is not registered at the gateway device in advance, to the mobile terminal device; and
        a user message notification unit configured to notify a message indicating the device identification information and the mobile carrier identification information notified from the mobile terminal device, and a fact that a user of the mobile terminal device as identified by the device identification information and the mobile carrier identification information has accepted a payment of a fee according to the accounting condition to a fixed communication network provider through the mobile carrier identified by the mobile carrier identification information, to a fixed communication network side, when the user's response indicating user's acceptance of the accounting condition is notified from the mobile terminal device.

2. A communication system, comprising:
    a mobile terminal device capable of accessing both a mobile communication network and a local network simultaneously; and
    a gateway device provided between a fixed communication network and the local network;
    the mobile terminal device having:
        an identification information notification unit configured to notify a device identification information of the mobile terminal device and a mobile carrier identification information of a mobile carrier to which the mobile terminal device belongs, to the gateway device, at a time of accessing the fixed communication network from the local network through the gateway device; and the gateway device having:
a checking unit configured to check whether the mobile terminal device is related to any illegal user or not according to the device identification information and the mobile carrier identification information notified from the mobile terminal device when the device identification information notified from the mobile terminal device is not registered at the gateway device in advance; and an access control unit configured to permit an access to the fixed communication network by the mobile terminal device and start a processing for monitoring the access to the fixed communication network by the mobile terminal device through the gateway device, when the mobile terminal device is not related to any illegal user as a result of checking by the checking unit.

3. A mobile terminal device capable of accessing both a mobile communication network and a local network simultaneously, the mobile terminal device comprising:
a first communication interface provided with respect to the mobile communication network;
a second communication interface provided with respect to the local network;
a packet communication unit configured to carry out first packet communications through the first communication interface and second packet communications through the second communication interface;
an identification information notification unit configured to notify a device identification information of the mobile terminal device and a mobile carrier identification information of a mobile carrier to which the mobile terminal device belongs, to a gateway device provided between a fixed communication network and the local network, at a time of accessing the fixed communication network via the gateway device, through the second communication interface; and
a user response notification unit configured to notify a user response indicating user's acceptance or refusal of a condition for the mobile terminal device to access the fixed communication network through the gateway device that is presented from the gateway device after the device identification information and the mobile carrier identification information are notified to the gateway device by the identification information notification unit.

4. The mobile terminal device of claim 3, wherein the user response notification unit notifies the user response indicating user's acceptance or refusal of the condition which indicates an accounting condition regarding a utilization fee to be paid by a user of the mobile terminal device to a fixed communication network provider through the mobile carrier identified by the mobile carrier identification information.

5. The mobile terminal device of claim 3, wherein the user response notification unit notifies the user response indicating user's acceptance or refusal of the condition which indicates that a log information regarding accesses by the mobile terminal device will be recorded.

6. The mobile terminal device of claim 3, wherein the second communication interface supports Bluetooth as the local network.

7. The mobile terminal device of claim 3, further comprising a voice communication unit configured to carry out voice communications.

8. A gateway device provided between a fixed communication network and a local network, the gateway device comprising:
a first communication interface provided with respect to the fixed communication network;
a second communication interface provided with respect to the local network;
a packet communication unit configured to carry out first packet communications through the first communication interface and second packet communications through the second communication interface;
an accounting condition notification unit configured to notify an accounting condition for a mobile terminal device to access the fixed communication network through the gateway device when a procedure for accessing the fixed communication network from the mobile terminal device is received through the second communication interface and a device identification information notified from the mobile terminal device is not registered at the gateway device in advance, to the mobile terminal device; and
a user message notification unit configured to notify a message indicating the device identification information and a mobile carrier identification information notified from the mobile terminal device, and a fact that a user of the mobile terminal device as identified by the device identification information and the mobile carrier identification information has accepted a payment of a fee according to the accounting condition to a fixed communication network provider through the mobile carrier identified by the mobile carrier identification information, to a fixed communication network side, when a user response indicating user's acceptance of the accounting condition is notified from the mobile terminal device through the second communication interface.

9. The gateway device of claim 8, wherein the second communication interface supports Bluetooth as the local network.

10. A gateway device provided between a fixed communication network and a local network, the gateway device comprising:
a first communication interface provided with respect to the fixed communication network;
a second communication interface provided with respect to the local network;
a packet communication unit configured to carry out first packet communications through the first communication interface and second packet communications through the second communication interface;
a checking unit configured to check whether a mobile terminal device is related to any illegal user or not according to a device identification information and a mobile carrier identification information notified from the mobile terminal device when a procedure for accessing the fixed communication network from the mobile terminal device is received through the second communication interface and the device identification information notified from the mobile terminal device is not registered at the gateway device in advance; and
an access control unit configured to permit an access to the fixed communication network by the mobile terminal device and start a processing for monitoring the access to the fixed communication network by the mobile terminal device through the gateway device, when the mobile terminal device is not related to any illegal user as a result of checking by the checking unit.

11. The gateway device of claim 10, wherein the second communication interface supports Bluetooth as the local network.

12. A gateway device provided between a fixed communication network and a local network, the gateway device comprising:
- a first communication interface provided with respect to the fixed communication network;
- a second communication interface provided with respect to the local network;
- a packet communication unit configured to carry out first packet communications through the first communication interface and second packet communications through the second communication interface;
- a processing unit configured to judge whether a packet received from a fixed communication network side and destined to a mobile communication network side via a mobile terminal device which is capable of accessing both a mobile communication network and the local network simultaneously, is to be relayed to the mobile terminal device through the second communication interface or not according to an attribute of the packet upon receiving the packet from the fixed communication network side through the first communication interface; and
- a transfer unit configured to transfer the packet to the mobile terminal device through the second communication interface when the packet is judged to be relayed by the processing unit.

13. The gateway device of claim 12, wherein the second communication interface supports Bluetooth as the local network.

14. A method for controlling a mobile terminal device capable of accessing both a mobile communication network and a local network simultaneously, the method comprising:
- notifying a device identification information of the mobile terminal device and a mobile carrier identification information of a mobile carrier to which the mobile terminal device belongs, to a gateway device provided between a fixed communication network and the local network, at a time of accessing the fixed communication network via the gateway device, through the local network; and
- notifying a user response indicating user's acceptance or refusal of a condition for the mobile terminal device to access the fixed communication network through the gateway device that is presented from the gateway device after the device identification information and the mobile carrier identification information are notified to the gateway device.

15. A method for controlling a gateway device provided between a fixed communication network and a local network, the method comprising:
- notifying an accounting condition for a mobile terminal device to access the fixed communication network through the gateway device when a procedure for accessing the fixed communication network from the mobile terminal device is received through the local network and a device identification information notified from the mobile terminal device is not registered at the gateway device in advance, to the mobile terminal device; and
- notifying a message indicating the device identification information and a mobile carrier identification information notified from the mobile terminal device, and a fact that a user of the mobile terminal device as identified by the device identification information and the mobile carrier identification information has accepted a payment of a fee according to the accounting condition to a fixed communication network provider through the mobile carrier identified by the mobile carrier identification information, to a fixed communication network side, when a user response indicating user's acceptance of the accounting condition is notified from the mobile terminal device through the local network.

16. A method for controlling a gateway device provided between a fixed communication network and a local network, the method comprising:
- checking whether a mobile terminal device is related to any illegal user or not according to a device identification information and a mobile carrier identification information notified from the mobile terminal device when a procedure for accessing the fixed communication network from the mobile terminal device is received through the local network and the device identification information notified from the mobile terminal device is not registered at the gateway device in advance; and
- permitting an access to the fixed communication network by the mobile terminal device and starting a processing for monitoring the access to the fixed communication network by the mobile terminal device through the gateway device, when the mobile terminal device is not related to any illegal user as a result of checking.

17. A method for controlling a gateway device provided between a fixed communication network and a local network, the method comprising:
- judging whether a packet received from a fixed communication network side and destined to a mobile communication network side via a mobile terminal device which is capable of accessing both a mobile communication network and the local network simultaneously, is to be relayed to the mobile terminal device through the local network or not according to an attribute of the packet upon receiving the packet from the fixed communication network side; and
- transferring the packet to the mobile terminal device through the local network when the packet is judged to be relayed.

18. A computer program product for causing a computer to control a mobile terminal device capable of accessing both a mobile communication network and a local network simultaneously, the computer program product comprising:
- first computer program codes for causing the computer to notify a device identification information of the mobile terminal device and a mobile carrier identification information of a mobile carrier to which the mobile terminal device belongs, to a gateway device provided between a fixed communication network and the local network, at a time of accessing the fixed communication network via the gateway device, through the local network; and
- second computer program codes for causing the computer to notify a user response indicating user's acceptance or refusal of a condition for the mobile terminal device to access the fixed communication network through the gateway device that is presented from the gateway device after the device identification information and the mobile carrier identification information are notified to the gateway device.

19. A computer program product for causing a computer to control a gateway device provided between a fixed communication network and a local network, the computer program product comprising:
- first computer program codes for causing the computer to notify an accounting condition for a mobile terminal device to access the fixed communication network through the gateway device when a procedure for accessing the fixed communication network from the mobile terminal device is received through the local network and a device identification information notified from the mobile terminal device is not registered at the gateway device in advance, to the mobile terminal device; and
- second computer program codes for causing the computer to notify a message indicating the device identification information and a mobile carrier identification information notified from the mobile terminal device, and a fact that a user of the mobile terminal device as identified by the device identification information and the mobile carrier identification information has accepted a payment of a fee according to the accounting condition to a fixed communication network provider through the mobile carrier identified by the mobile carrier identification information, to a fixed communication network side, when a user response indicating user's acceptance of the accounting condition is notified from the mobile terminal device through the local network.

20. A computer program product for causing a computer to control a gateway device provided between a fixed communication network and a local network, the computer program product comprising:
- first computer program codes for causing the computer to check whether a mobile terminal device is related to any illegal user or not according to a device identification information and a mobile carrier identification information notified from the mobile terminal device when a procedure for accessing the fixed communication network from the mobile terminal device is received through the local network and the device identification information notified from the mobile terminal device is not registered at the gateway device in advance; and
- second computer program codes for causing the computer to permit an access to the fixed communication network by the mobile terminal device and start a processing for monitoring the access to the fixed communication network by the mobile terminal device through the gateway device, when the mobile terminal device is not related to any illegal user as a result of checking.

21. A computer program product for causing a computer to control a gateway device provided between a fixed communication network and a local network, the computer program product comprising:
- first computer program codes for causing the computer to judge whether a packet received from a fixed communication network side and destined to a mobile communication network side via a mobile terminal device which is capable of accessing both a mobile communication network and the local network simultaneously, is to be relayed to the mobile terminal device through the local network or not according to an attribute of the packet upon receiving the packet from the fixed communication network side; and
- second computer program codes for causing the computer to transfer the packet to the mobile terminal device through the local network when the packet is judged to be relayed.

* * * * *